(12) United States Patent
Ueno

(10) Patent No.: US 6,496,224 B2
(45) Date of Patent: Dec. 17, 2002

(54) IMAGING DEVICE INCLUDING THINNED READ OUT MODE AND ALL PIXEL READ OUT MODE

(75) Inventor: Hiroyuki Ueno, Kanagawa (JP)

(73) Assignee: Sony Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/902,910

(22) Filed: Jul. 30, 1997

(65) Prior Publication Data

US 2001/0043276 A1 Nov. 22, 2001

(30) Foreign Application Priority Data

Aug. 2, 1996 (JP) .................... 8-204428

(51) Int. Cl.$^7$ .................................. H04N 3/14
(52) U.S. Cl. ............ 348/322; 348/311; 348/312; 348/320; 348/282
(58) Field of Search .............. 348/312, 317, 348/320, 322, 296, 297, 298, 299, 311, 282; 257/242; 377/62, 63

(56) References Cited

U.S. PATENT DOCUMENTS

| | | | | |
|---|---|---|---|---|
| 4,761,689 A | * | 8/1988 | Takatsu et al. | 348/311 |
| 4,764,814 A | * | 8/1988 | Endo et al. | 348/311 |
| 5,003,398 A | * | 3/1991 | Suzuki | 348/297 |
| 5,187,584 A | * | 2/1993 | Nishiki et al. | 348/319 |
| 5,258,845 A | * | 11/1993 | Kyuma et al. | 348/299 |
| 5,497,195 A | * | 3/1996 | Sayag | 348/311 |
| 5,828,407 A | * | 10/1998 | Suzuki | 348/296 |

* cited by examiner

*Primary Examiner*—Wendy R. Garber
*Assistant Examiner*—Luong Nguyen
(74) *Attorney, Agent, or Firm*—Sonnenschein, Nath & Rosenthal

(57) ABSTRACT

To avoid mixtures of signal charges read out in an all-pixel read out mode and also in a thinning read out mode, a charge sweeping-out pulse is produced from a timing generating circuit of a CCD solid-state imaging device. In the CCD solid-state imaging device, there are provided a solid-state imaging element capable of being selectively operable in an all-pixel read out mode where signal charges of all pixels are independently read out at the same time instant, and in a thinning read out mode where signal charges are read out only from a portion of pixel columns along the vertical direction, and a timing generating circuit for generating at least one piece of a signal charge sweeping-out pulse used to discharge the signal charges of the respective pixels just after the signal charges are read out during an exposing time period immediately before a read out operation is transferred from the thinning read out mode to the all-pixel read out mode.

26 Claims, 9 Drawing Sheets

FIG. 1
(RELATED ART)

ODD FIELD      EVEN FIELD

FIG. 2
(RELATED ART)

ODD FIELD          EVEN FIELD

IMAGING DEVICE INCLUDING THINNED READ OUT MODE AND ALL PIXEL READ OUT MODE

BACKGROUND OF THE INVENTION

The present invention generally relates to a solid-state imaging device, and a method for driving the solid-state imaging device and also to a solid-state imaging camera. More specifically, the present invention is directed to a solid-state imaging device suitably employed as an imaging device in a picture (imaging) appliance such as a video camera and an electronic still camera, and to a method for driving such a solid-state imaging device, and also to a camera equipped with such a solid-state imaging device.

Figure 1:
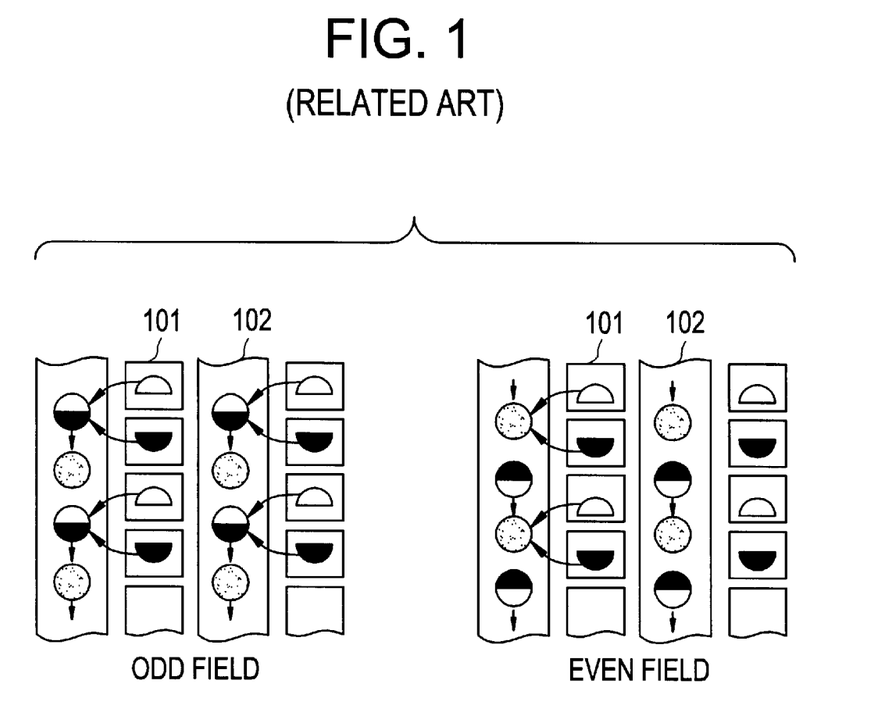
FIG. 1 is an explanatory diagram for explaining the field reading out method of the conventional solid-state imaging device.

A conventional solid-state imaging apparatus used in a video camera and the like, for example, a CCD (charge-coupled device) solid-state imaging device, may realize the interlaced scanning operation by a so-called "field reading out method" since the interlace-mode output signal is produced. As indicated in FIG. 1, signal charges which are stored in a sensor unit 101 only during 1/60 seconds (equivalent to 1 field period) and are read out from the respective sensor units 101 are mixed with each other between two pixels positioned adjacent to each other along the vertical direction in a vertical CCD 102, and then the mixed signal charges are outputted. Also, the mixing combination of the two pixels positioned adjacent to each other along the vertical direction is varied every field.

Figure 2:
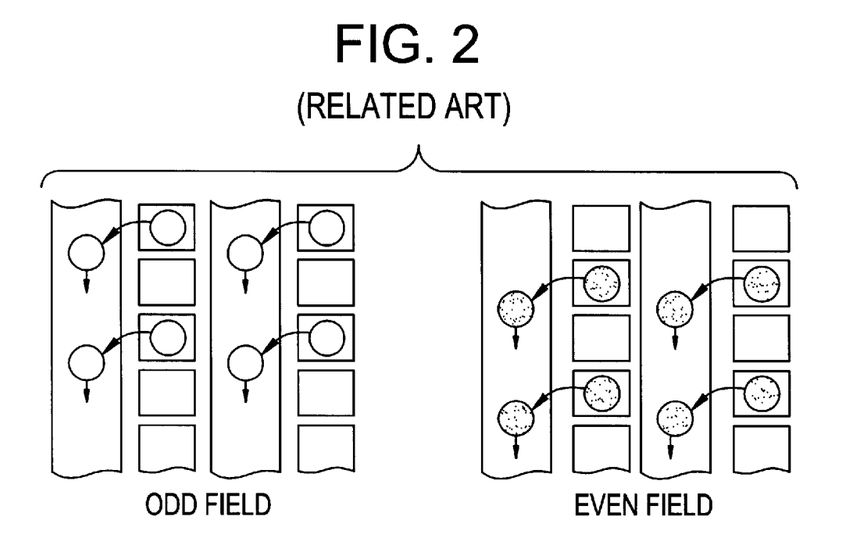
FIG. 2 is an explanatory diagram for explaining the frame reading out method of the conventional solid-state imaging device.

In this field reading out method, the storage time of the signal charge in each of the pixels is equal to 1/60 seconds. This storage time becomes a half, as shown in FIG. 2, as compared with that of a so-called "frame reading out method". In this frame reading out method, the signal charge in the odd line and the signal charge in the even line are alternately read out within storage time of 1/30 seconds every field. Therefore, this field reading out method owns an advantage that moving pictures can be imaged under better condition. To the contrary, since the signal charges of the two pixels are mixed with each other along the vertical direction, this field reading out method owns such a drawback that the vertical resolution is lowered. As a consequence, this field reading out method is not suitable as in imaging method for an electronic still camera requiring high vertical resolution.

Figure 3:
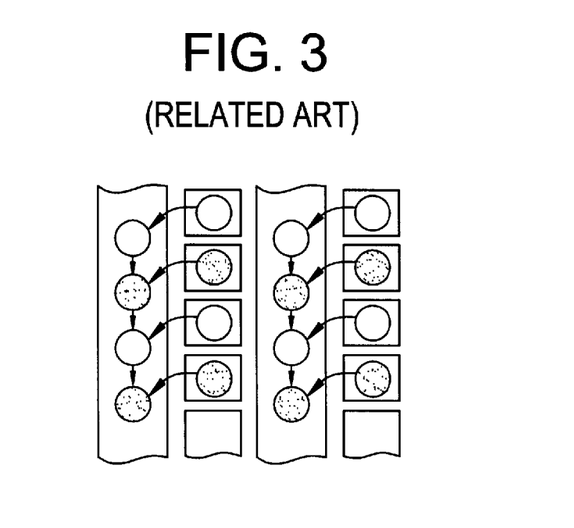
FIG. 3 is an explanatory diagram for explaining the all-pixel reading out method of the conventional solid-state imaging device.

Under such a circumstance, very recently, electronic still cameras employ a so-called "all-pixel reading out type CCD solid-state imaging device". In this all-pixel reading out type CCD solid-state imaging device, as represented in FIG. 3, the signal charges of the respective pixels are not mixed with each other in the vertical CCD, but are independently read out at the same time instant. In accordance with this all-pixel reading out type CCD imaging device, it is possible to realize the vertical resolution two times higher than that of the above-explained field reading out type solid-state imaging device, assuming now that the total pixel quantity of the all-pixel reading out type CCD imaging device is equal to that of the field reading out type CCD imaging device. To the contrary, this all-pixel reading out type CCD solid-state imaging device would require the output time of the imaging signal two times longer than that of the field reading out type CCD imaging device.

On the other hand, monitors for displaying imaged pictures thereon are normally provided with electronic still cameras in order to perform focusing controls and/or camera angle controls during imaging operations. In an electronic still camera equipped with a so-called "all-pixel reading out type CCD solid-state imaging device" as an imaging device, since an output operation of an imaging signal requires twice longer time than that of another reading out type CCD solid-state imaging device in order to display an image on a monitor, the imaging signal must be outputted at high speed.

To this purpose, a so-called "thinning read out drive operation" has been proposed by the Applicant in Japanese Laid-open Patent Application No. Hei-8-78315 opened in 1996 as the method capable of outputting the imaging signals at high speed in the all-pixel reading out type CCD solid-state imaging device. In this CCD solid-state imaging device, the signal charges are read out only from a portion of the pixel columns along the vertical direction. In this thinning read out drive operation, the charges are left in the thinned pixel columns. As a consequence, considering now such a case that the reading out operation is transferred from the thinning read out mode to the all-pixel read out mode, there are some possibilities that these left signal charges are mixed with the signal charges read out during the all-pixel read out drive operation.

SUMMARY OF THE INVENTION

The present invention has been made to solve the above-described problems, and therefore, has an object to provide a solid-state imaging device and a drive method thereof, and also a solid-state imaging device camera, capable of acquiring signal charges of the respective pixels read out in the all-pixel read out mode when signal reading out operation is transferred from the thinning read out mode to the all-pixel read out mode, while avoiding such a problem that the signal charges left during the thinning read out drive operation are mixed with the signal charges read out during the all-pixel read out drive operation.

A solid-state imaging device, according to an aspect of the present invention, is arranged by comprising: a solid-state imaging element capable of being selectively operable in an all-pixel read out mode where signal charges of all pixels are independently read out at the same time instant, and in a thinning read out mode where signal charges are read out only from a portion of pixel columns along the vertical direction; and a timing generating circuit for generating at least one piece of a signal charge sweeping-out pulse used to discharge the signal charges of the respective pixels just after the signal charges are read out during an exposing time period immediately before a read out operation is transferred from the thinning read out mode to the all-pixel read out mode.

Also, according to another aspect of the present invention, a method for driving a solid-state imaging device equipped with a solid-state imaging element capable of being selectively operable in an all-pixel read out mode where signal charges of all pixels are independently read out at the same time instant, and in a thinning read out mode where signal charges are read out only from a portion of pixel columns along the vertical direction, is featured by that in an exposing time period immediately before a read out operation is transferred from the thinning read out mode to the all-pixel read out mode, the signal charges of the respective pixels are discharged at least one time immediately after the signal charges are read out.

A further aspect of the present invention, a camera is featured by comprising: a solid-state imaging device including a solid-state imaging element capable of being selectively operable in an all-pixel read out mode where signal charges of all pixels are independently read out at the same time instant, and in a thinning read out mode where signal charges are read out only from a portion of pixel columns along the vertical direction; and a timing generating circuit for generating at least one piece of a signal charge sweeping-out pulse used to discharge the signal charges of W the respective pixels just after the signal charges are read out during an exposing time period immediately before a read out operation is transferred from the thinning read out mode to the all-pixel read out mode; and an optical system for conducting incident light to an imaging area of the solid-state imaging device.

In the solid-state imaging device, the driving method thereof, and the camera with employment of the above-described featured arrangement, since at least one piece of the charge sweeping-out pulse is produced just after the signal charges are read out during the exposing time period immediately before the read out mode is transferred from the thinning read out mode to the all-pixel read out mode, such signal charges can be discharged. That is, these signal charges have not been read out from the thinned pixel columns during the thinning read out drive operation, and thus are left therein. As a consequence, when the read out operation is transferred to the all-pixel read out drive operation, it is possible to avoid such an adverse influence caused by that the left signal charges during the thinning read out drive operation are mixed with the signal charges read out during this all-pixel read out drive operation.

BRIEF DESCRIPTION OF THE DRAWING

A more complete understanding of the teachings of the present invention may be acquired by referring to the accompanying figures, in which like reference numbers indicate like features and wherein.

DETAILED DESCRIPTION OF THE PREFERRED EMBODIMENTS

Figure 4:
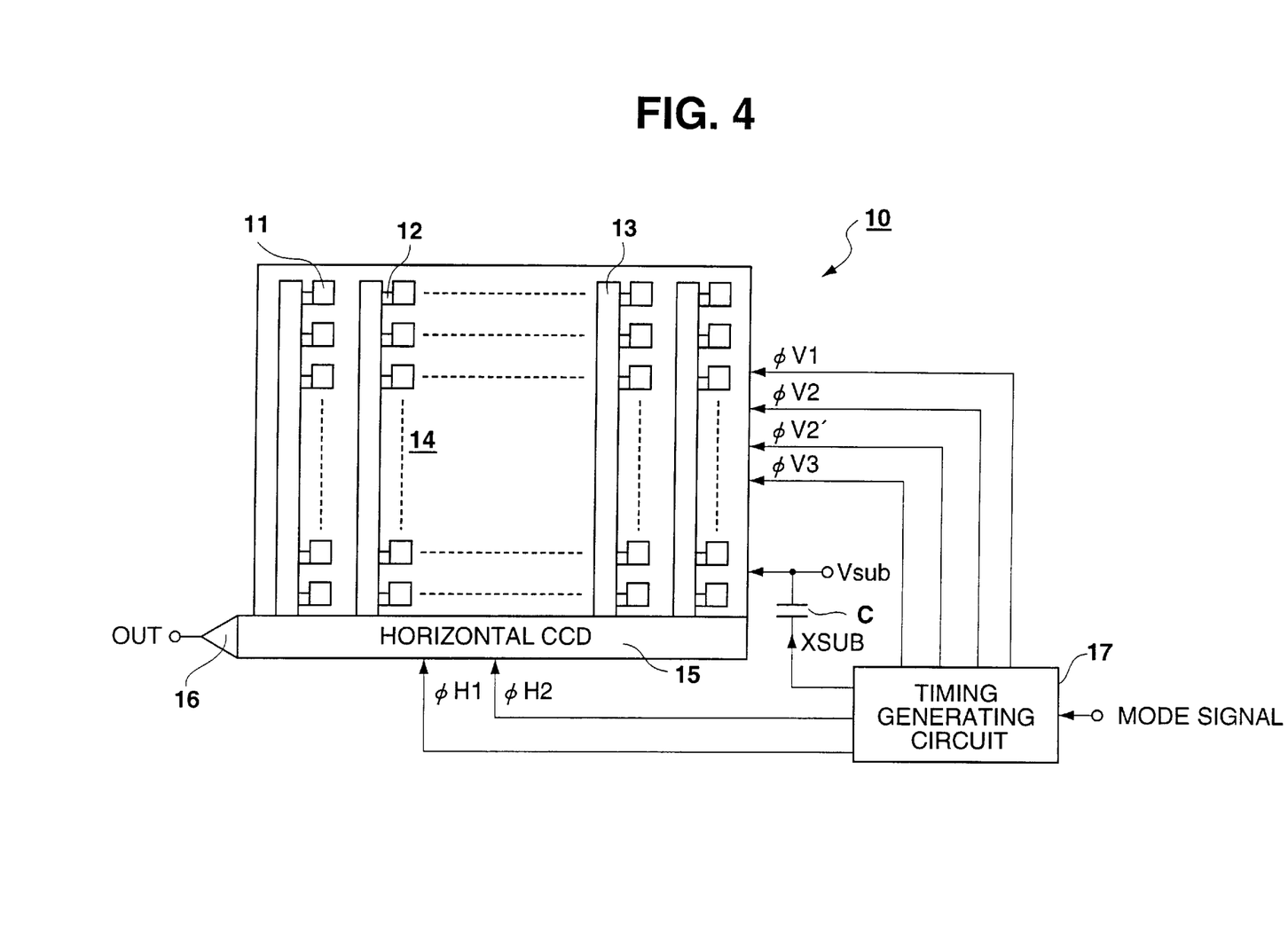
FIG. 4 is a schematic structural diagram of an interline transfer type CCD solid-state imaging element according to an embodiment of the present invention.

Referring now to drawings, various preferred embodiments of the present invention will be described. FIG. 4 is a schematic structural diagram for representing an embodiment of the present invention which is applied to, for instance, an interline transfer type CCD (charge-coupled device) solid-state imaging element.

In FIG. 4, an imaging area 14 is arranged by a plurality of sensor units 11, and a plurality of vertical CCDs 13. The sensor units 11 are arranged in a matrix form in a row (vertical) direction and a column (horizontal) direction, and convert incident light into signal charges having amounts of electron charges in response to light amounts of the incident light, and then store these converted signal charges. The plural vertical CCDs 13 are provided with each of the vertical columns of these sensor units 11, and vertically transfer the signal electron charges read out from the respective sensor units 11 by a read out gate unit 12.

In this imaging area 14, the sensor units 11 are constructed of, for instance, PN junctions of photodiodes. Upon application of a read out pulse XSG (will be discussed later) to the read out gate unit 12, the signal charges stored in the sensor units 11 are read out into the vertical CCD 13. The vertical CCD 13 is arranged by, for example, a 3-layer electrode/3-phase (øV1 to øV3) drive mode. The vertical CCD 13 sequentially transfers the signal charges read out from the respective sensor units 11 along the vertical direction in a signal form corresponding to 1 scanning line (1 line) during a portion of the horizontal blanking period.

In this vertical CCD 13, the transfer electrode of the second phase (øV2) may also have a function of a gate electrode of the read out gate unit 12. Under such a circumstance, the 3-phase vertical transfer clocks øV1 to øV3 are set in such a manner that the vertical transfer clock øV2 of the second phase owns three values, namely a low level (will be referred to as a "L" level hereinafter), an intermediate level (will be referred to as an "M" level hereinafter), and a high level (will be referred to as an "H" level hereinafter). This "H"-leveled pulse of the third value will constitute the read out pulse XSG applied to the read out gate unit 12.

A horizontal CCD 15 is arranged on a lower side (as viewed in this drawing) of the imaging area 14. The signal charges corresponding to 1 line are sequentially transferred from a plurality of vertical CCDs 13 to this horizontal CCD 15. The horizontal CCD 15 is arranged by, for example, a 2-layer electrode/2-phase (øH1, øH2) drive mode. This horizontal CCD 15 sequentially transfers the signal charges corresponding to 1 line, which have been transferred from a plurality of vertical CCDs 13 along the horizontal direction within the horizontal scanning period after the horizontal blanking period.

At an edge portion to which the signal charges are transferred from the horizontal CCD 15, a charge/voltage converting unit 16 is constituted by, for example, a floating diffusion amplifier structure. This charge/voltage converting unit 16 sequentially converts the signal charges which have been horizontally transferred by the horizontal CCD 15 into signal charges which will then be outputted. This voltage signal is derived as a CCD output "OUT" in correspondence with an amount of incident light from an imaging object.

With the above-described structure, the interline transfer type CCD solid-state imaging element 10 is constructed.

In the CCD solid-state imaging element 10 with the above-described structure, the amount of signal charges stored in the sensor unit 11 may be determined by a height of a potential barrier on the side of the substrate. This height of the potential barrier may be determined by a bias voltage applied to the substrate. As a result, a substrate bias voltage Vsub having a predetermined level is applied to the substrate of the CCD solid-state imaging device 10, and this predetermined level is determined, depending upon the respective devices.

In such a case that the charges stored in the sensor unit 11 are discharged in a batch mode to, for example, the substrate, a charge sweeping-out pulse XSUB having a high voltage is superimposed with a substrate bias voltage Vsub via a capacitor C, and the superimposed charge sweeping-out pulse XSUB is applied to the substrate. As a result, since the potential barrier on the side of the substrate collapses, the signal charges stored in the sensor unit 11 are discharged to the substrate. Normally, this charge sweeping-out pulse XSUB is used as a shutter pulse capable of controlling the storage time of the signal charge to the sensor unit 11, namely the exposing time in view of an electronic shutter function.

Figure 5:
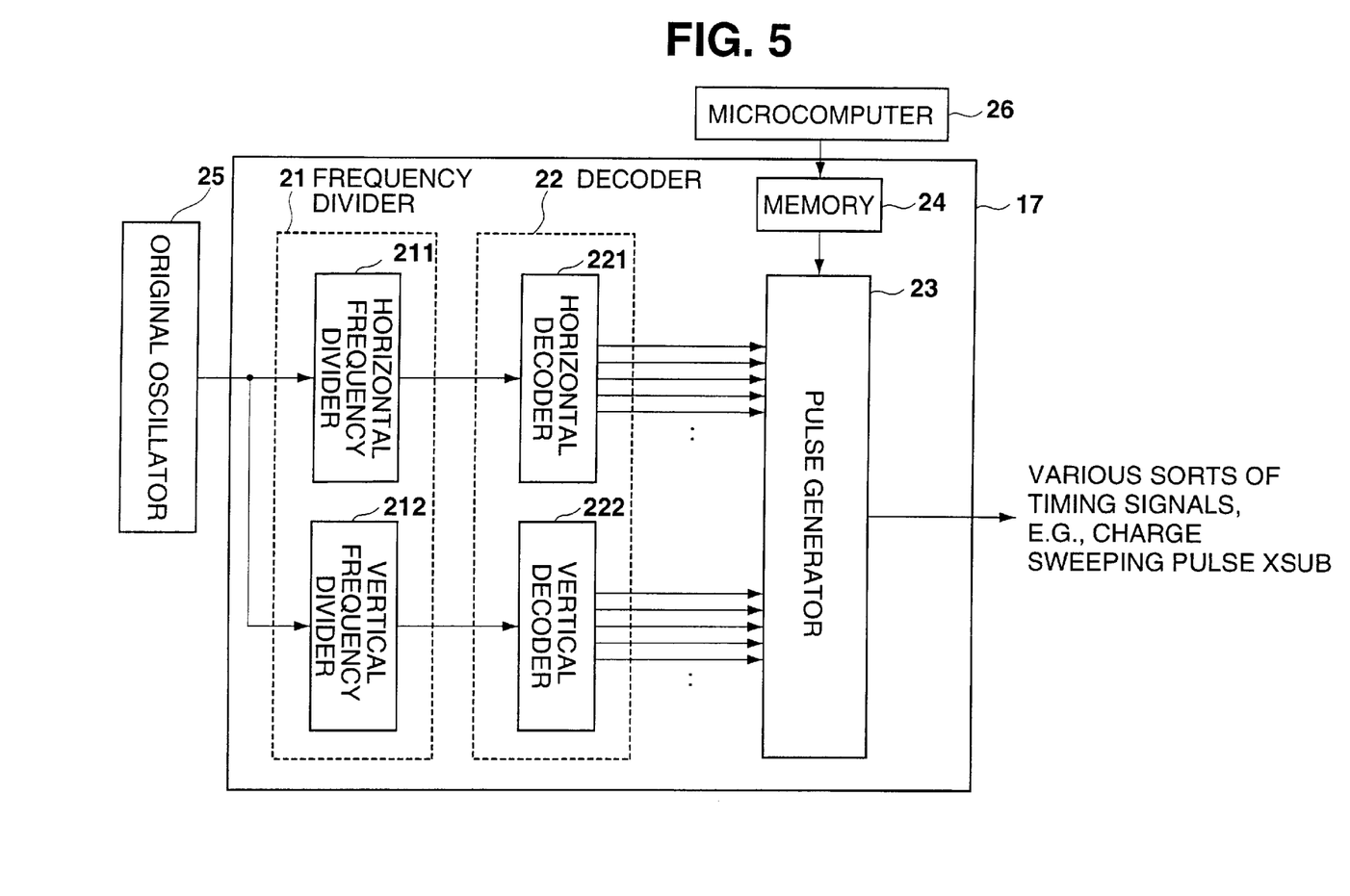
FIG. 5 is a schematic block diagram for representing a structural example of the timing generating circuit 17 employed in the CCD solid-state imaging element of FIG. 4.

Various sorts of timing signals involving the vertical transfer clocks øV1 to øV3 used to drive this CCD solid-state imaging element 10, the horizontal transfer clocks øH1, øH2, and also the charge sweeping-out pulse XSUB are produced in a timing generating circuit 17. An example of an internal circuit arrangement of this timing generating circuit 17 is ma shown in FIG. 5. In FIG. 5, the timing generating circuit 17 is constructed of a frequency divider 21, a decoder 22, a pulse generator 23, and a memory 24.

The frequency divider 21 is arranged by a horizontal frequency divider 211, and a vertical frequency divider 212. A reference pulse having a predetermined frequency and produced from an original oscillator 25 is frequency-divided by the respective horizontal and vertical frequency dividers 211 and 212. The decoder 22 is constituted by a horizontal decoder 221 and a vertical decoder 222. The pulses obtained from the respective frequency dividers 211 and 212 are counted by the respective decoders 221 and 222 to thereby produce decoded values. Under control by the data supplied from a microcomputer 26 and saved in the memory 24, the pulse generator 23 produces various sorts of timing signals involving the charge sweeping-out pulse XSUB by using the decoded values obtained from the respective decoders 221 and 222.

Also, in response to an externally supplied mode signal, this timing generating circuit 17 is so arranged that both the all-pixel read out mode and the thinning read out mode are acceptable. In the all-pixel read out mode, the signal charges of all of the pixels are independently read out at the same time instant. In the thinning read out mode, the signal charges are read out only from a portion of the pixel columns along the vertical direction. Then, as to the vertical transfer clock øV2 of the second phase, clocks (øV2, øV2') of two series are produced in correspondence with these two read out modes.

Figure 6:
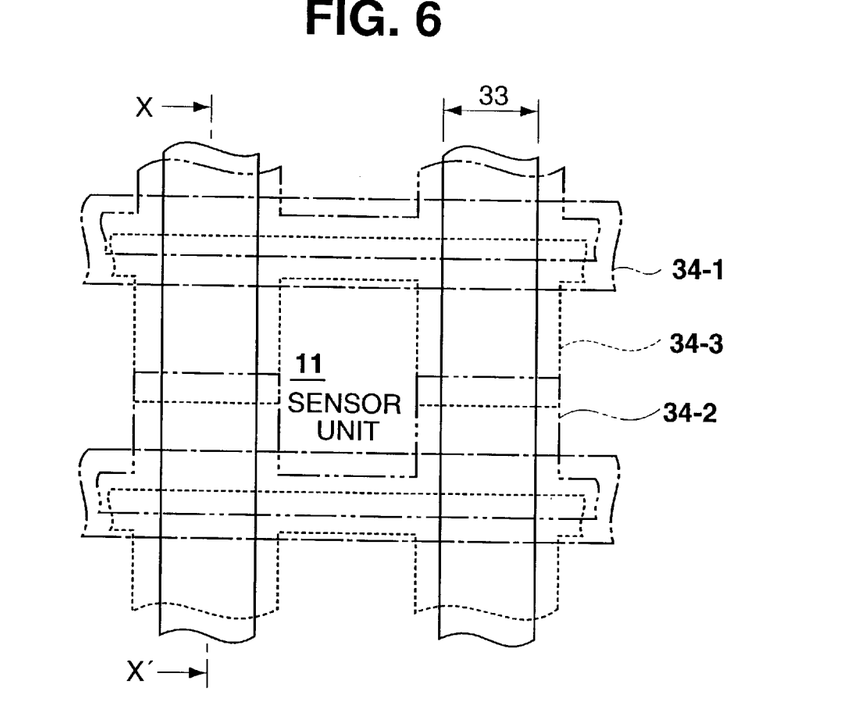
FIG. 6 is a plan pattern diagram for indicating one structural example of a unit pixel.
Figure 7:
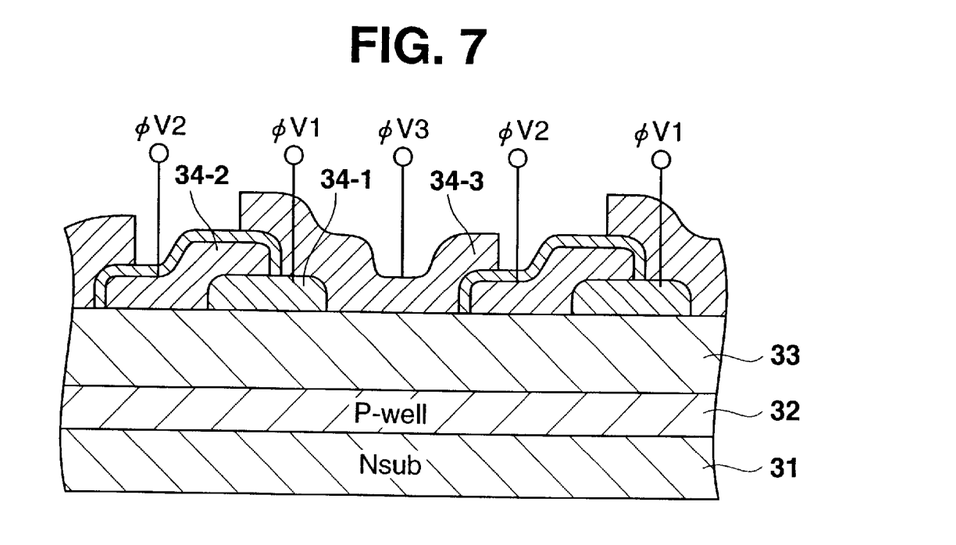
FIG. 7 is a sectional view for showing the structure of the unit pixel, taken only a line X–X' of FIG. 6.

FIG. 6 is a plan pattern diagram for showing an example of a concrete structure of a unit pixel. FIG. 7 is a sectional view for showing this concrete structure, taken along a line X–X' of FIG. 6. First, the vertical CCD 13 is constituted of a transfer channel 33 made of an N type impurity, and 3-phase transfer electrodes 34-1 to 34-3. The transfer channel 33 is fabricated on an N type substrate 31 via a P type well 32. The 3-phase transfer electrodes 34-1 to 34-3 are arranged in a repeated form above this transfer channel 33 along a transfer direction thereof. In these transfer electrodes 34-1 to 34-3, the transfer electrode 34-1 for the first phase is formed by polysilicon of a first layer (indicated by a dot and dash line shown in FIG. 6); the transfer electrode 34-2 for the second phase is formed by polysilicon of a second layer (indicated by a two-dot/dash line of FIG. 6); and the transfer electrode 34-3 for the third phase is formed by polysilicon of a third layer (indicated by a broken line of FIG. 6).

Figure 8:
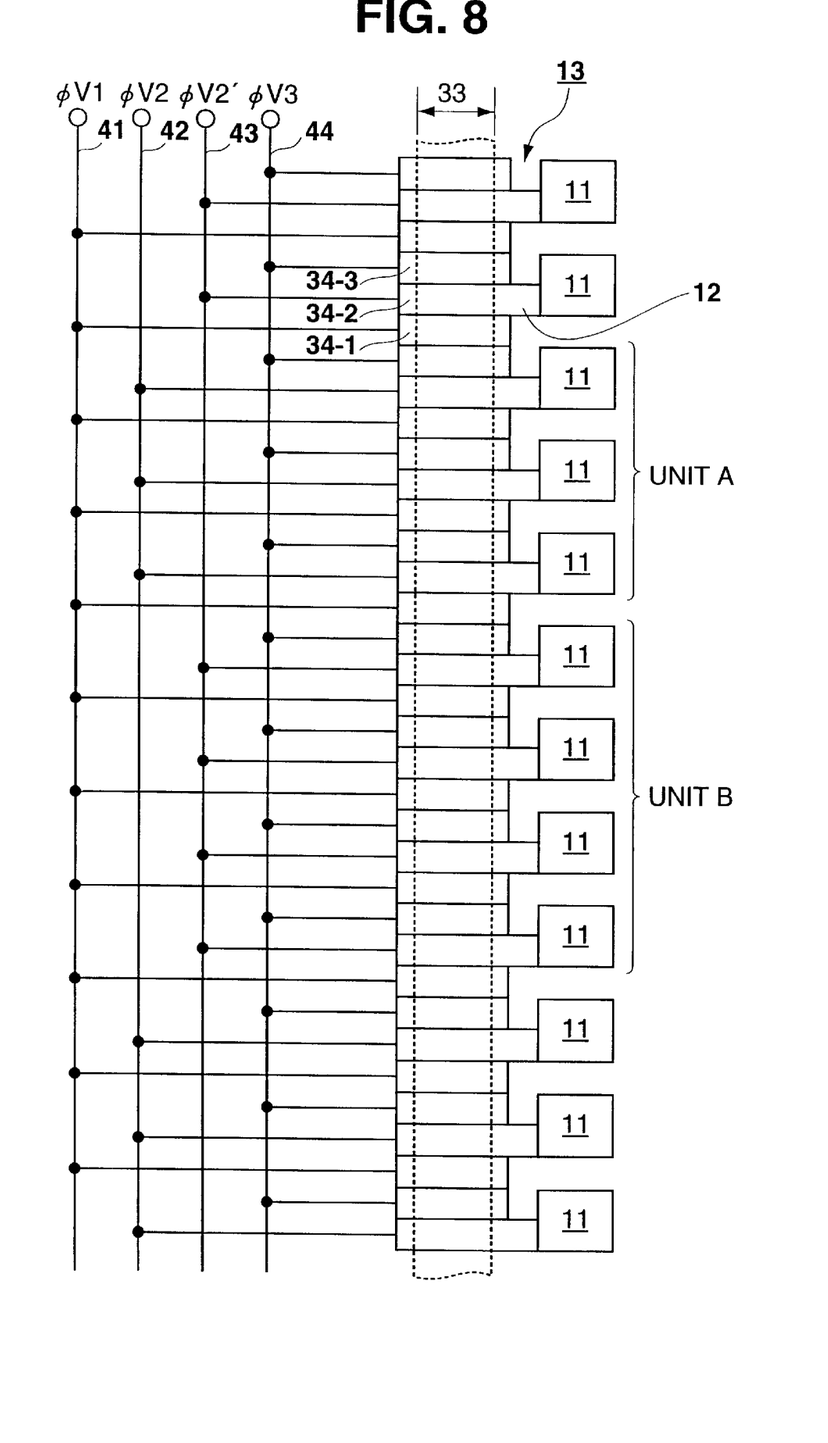
FIG. 8 schematically illustrates a wiring pattern of the vertical CCD.
Figure 9:
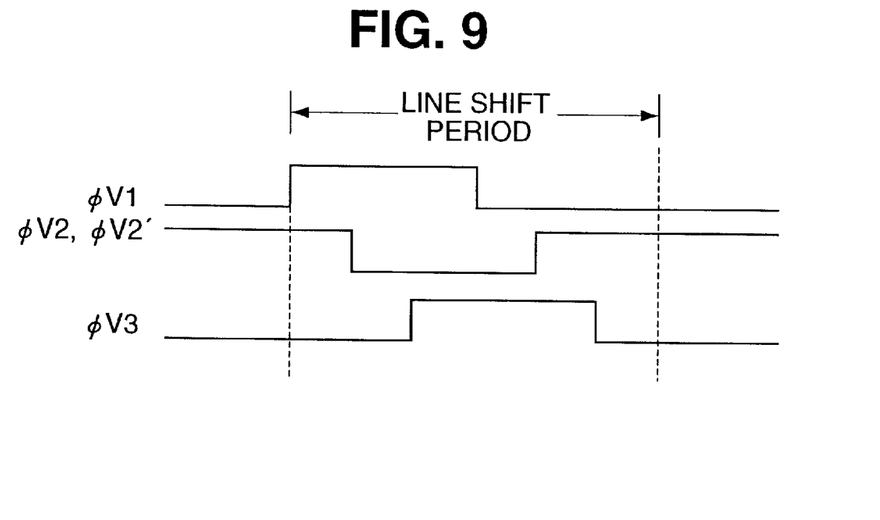
FIG. 9 is a timing chart for indicating a phase relationship of the 3-phase vertical transfer clock.

FIG. 8 shows a wiring pattern diagram for the transfer electrodes 34-1 to 34-3 in the vertical CCD 13. In this wiring line system, a specific idea is made in the wiring line for the vertical transfer clock øV2 of the second phase in order that the CCD solid-state imaging element 10 can be driven by the thinning read out drive mode. In a concrete example, as previously explained, two signal systems of vertical transfer clocks øV2 and øV2' are prepared as the vertical transfer clock of the second phase. Furthermore, four bus lines 41 to 44 in total are arranged as the wiring lines used to transfer the vertical transfer clocks øV1, øV2, øV2', and øV3. It should be noted that FIG. 9 indicates a phase relationship among the vertical transfer clocks øV1, øV2, øV2' and øV3 during a line shift period.

Then, the first-phase transfer electrodes 34-1 and 34-3 of all of the pixels are connected to the bus lines 41 and 44 used to transfer the vertical transfer clocks øV1 and øV3. Also, the transfer electrode 34-2 of the second phase for these pixels is connected to the bus line 42 for transmitting the vertical transfer clock øV2 every four pixels, while using three pixels located before/after this pixel as a unit "A". The transfer electrode 34-2 of the second phase for these pixels is connected to the bus line 43 for transmitting the vertical transfer clock øV2' every three pixels, while using four pixels other than the pixels connected to the bus line 42.

Figure 10A:
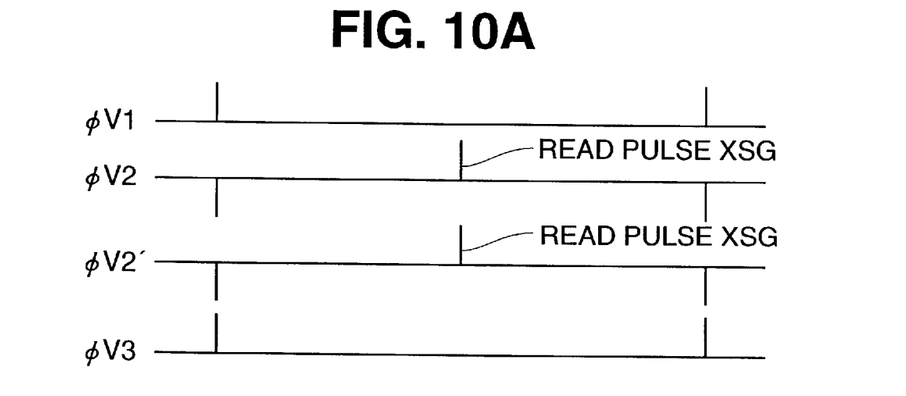
FIG. 10A is a timing chart for explaining read out pulses XSG in the all-pixel read out mode.
Figure 10B:
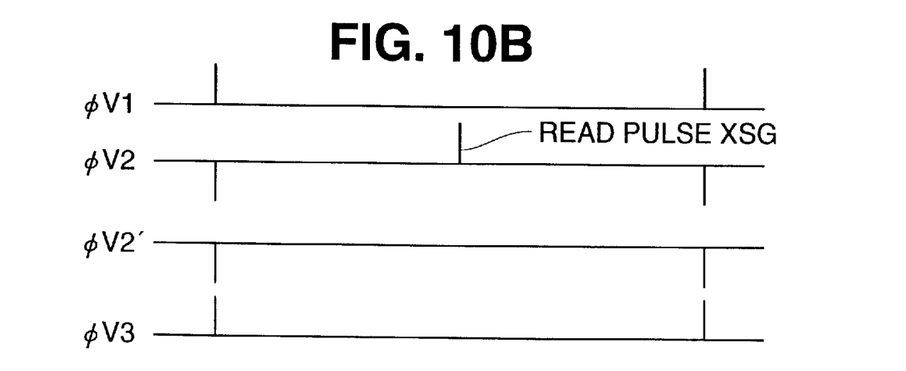
FIG. 10B is a timing chart for explaining read out pulses XSG in the thinning read out mode.

As previously described, the vertical transfer clocks øV2 and øV2' will constitute the read out pulse XSG where the pulse having the "H" level of the third value is applied to the gate electrode of the read out gate unit 12 when the signal charges are read out from the sensor unit 11. Then, in the all-pixel read out mode, as indicated in FIG. 10A, the read out pulses XSG rise with respect to both the vertical transfer clocks øV2 and øV2', whereas the read out pulse XSG rises only for the vertical transfer clock øV2 in the thinning read out mode, as indicated in FIG. 10B.

In other words, in the all-pixel read out mode, since the read out pulses XSG rise with respect to all of the vertical transfer clocks øV2 and øV2', the signal charges are read out from all of the pixels of the CCD solid-state imaging element. On the other hand, since the read out pulse XSG rises only for the vertical transfer clock øV2 in the thinning read out mode, the signal charges are read out every 4 lines while setting 3 lines as 1 unit. That is to say, the reading out operations of the signal charges are thinned every 3 lines while setting 4 lines as 1 unit.

It should be understood that in this embodiment, in the color mode CCD solid-state imaging element, the thinning operations are carried out every 4 lines while setting 3 lines as 1 unit in accordance with the color coding of the color filters. However, the present invention is not limited to this example, but may be modified. For instance, the thinning operation of the signal charges may be arbitrarily carried out every 2 lines while setting 4 lines as 1 unit, or every 1 line while setting 2 lines as 1 unit by merely changing the wiring patterns of the vertical transfer clocks øV2 and øV2' of FIG. 8.

Figure 11:
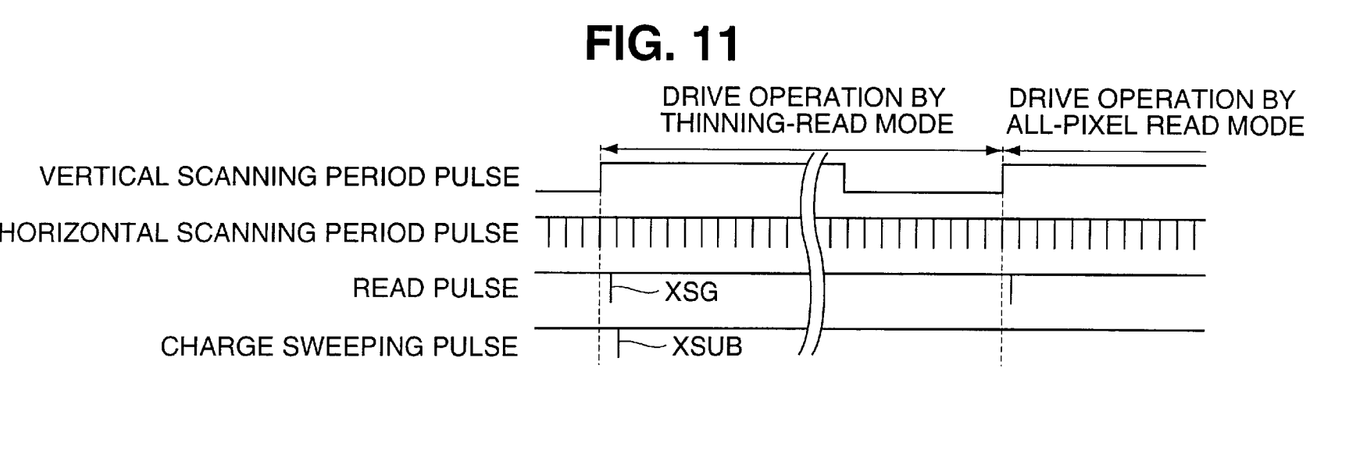
FIG. 11 is a timing chart for showing one example of operations of the CCD solid-state imaging element according to the present invention.

Next, mode transfer operation from the thinning read out mode to the all-pixel read out mode will now be explained with reference to a timing chart of FIG. 11. That is, the mode transfer operation from the thinning read out mode to the all-pixel read out mode is carried out by externally supplying a mode change signal to the timing generating circuit 17. Upon supply of this mode signal, the timing generating circuit 17 produces the read out pulse XSG only for the vertical transfer clock øV2 in the thinning read out mode, whereas the timing generating circuit 17 produces the read out pulses XSG with respect to both the vertical transfer clocks øV2 and øV2' in the all-pixel read out mode.

In this case, as previously described, in the thinning read out mode, no signal charges are read out from the thinned pixel columns, and therefore are left therein. As a result, there are some possibilities that when the read out mode is transferred from the thinning read out mode to the all-pixel read out mode, the signal charges remained during the thinning read out drive operation are mixed with the signal charges read out during the all-pixel read out drive operation, resulting in an occurrence of noise.

Accordingly, when the read out operation is transferred from the thinning read out mode to the all-pixel read out mode in the timing generating circuit 17, one piece of the charge sweeping-out pulse XSUB is produced during the exposing time period just before this mode transfer operation, immediately after reading out of the signal charges, namely immediately after the read out pulse XSG is produced. Thus, the signal charges left during the thinning read out drive operation are discharged to the substrate. It should also be noted that the number of the produced charge sweeping-out pulses XSUB is not limited to 1, but a plurality of charge sweeping-out pulses XSUB may be continuously produced, if required. When a plurality of charge sweeping-out pulse XSUB are produced, the signal charges remained in the pixel columns may be more firmly discharged.

Also, as explained before, the reason why the charge sweeping-out pulse XSUB is generated just after the signal charges are read out is to consider such a fact that this charge sweeping-out pulse XSUB is used to control the exposing time in the normal electronic shutter function and the like. If the charge sweeping-out pulse XSUB is generated immediately after the signal charges are read out, since the exposing time may be set to sufficiently long time, even when a plurality of charge sweeping-out pulses XSUB are continuously produced, then a very small adverse influence is given to the exposing time itself by a difference in the pulse generations.

As described in detail, since at least one piece of the charge sweeping-out pulse XSUB is generated just after the signal charges are read out during the exposing time period immediately before the read out operations is transferred from the thinning read out mode to the all-pixel read out mode, the signal charges left in the pixel columns thinned during the thinning read out drive operation can be discharged. As a consequence, thereafter when the read out operation is transferred to the all-pixel read out drive mode, it is possible to avoid such a problem that these remaining signal charges are mixed with the signal charged read out during the all-pixel reading out operation.

Figure 12:
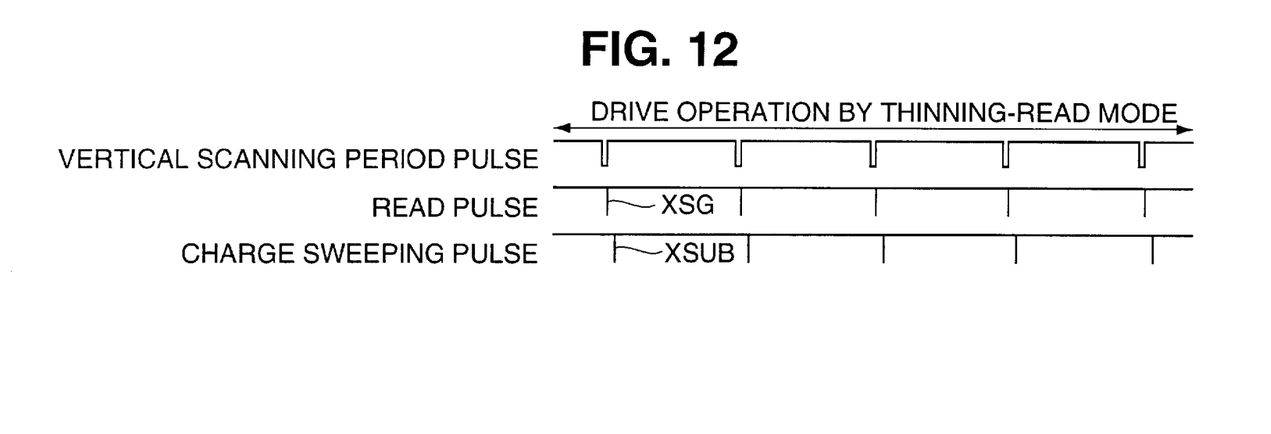
FIG. 12 is a timing chart for indicating another example of operations of the CCD solid-state imaging element according to the present invention.

Also, as represented in a timing chart of FIG. 12, in this timing generating circuit 17, at least one piece of the charge sweeping-out pulse XSUB is generated not only in the exposing time period just before the read out operation is transferred from the thinning read out mode to the all-pixel read out mode, but also in the time period of the thinning read out mode, immediately after the signal charges are read out, namely, immediately after the read out pulse XSG is produced.

As a consequence, this structure may become useful in such a case that a very large amount of light is suddenly entered into the CCD solid-state imaging element. In other words, in the case that such a very large amount of light is suddenly entered, when the signal charges are swept out only during the exposing time period just before the read out operation is transferred from the thinning read out mode to the all-pixel read out mode, there are certain risks that the signal charges left during the thinning read out drive operation may overflow from the relevant pixel and then may flow into other pixels. However, since these left signal charges are swept out even during the thinning read out drive operation, such a signal charge overflow problem can be solved.

Figure 13:
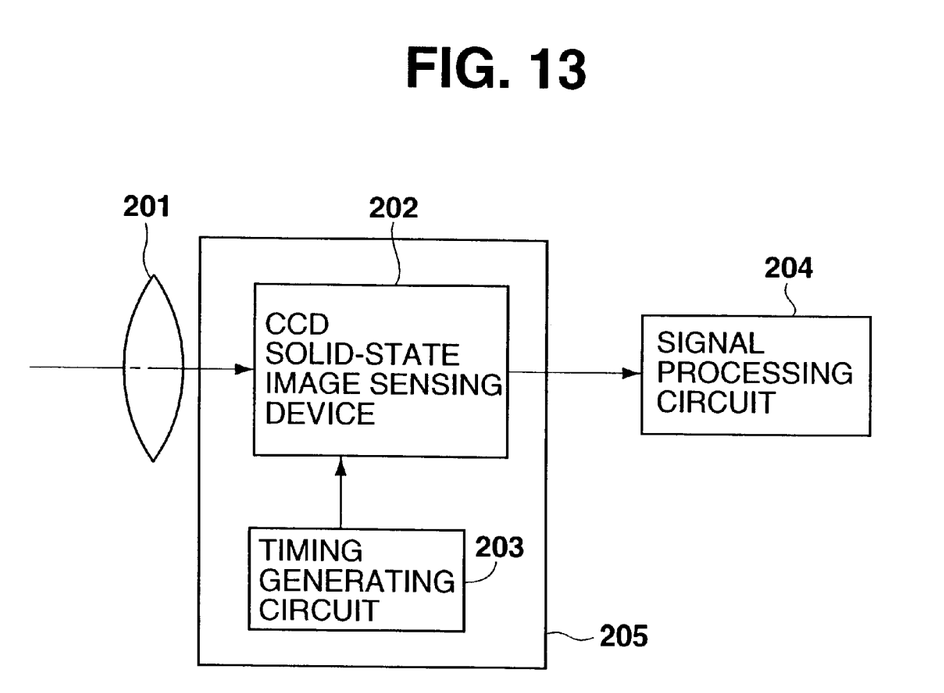
FIG. 13 is a schematic diagram for indicating an internal arrangement of a camera according to an embodiment of the present invention.

In FIG. 13, there is shown a schematic structural diagram of a camera according to another embodiment of the present invention. In this camera, light derived from an imaging object (not shown) is conducted by an optical system such as a lens 201 to an imaging area of a solid-state imaging element 202 employed in a solid-state imaging apparatus 205. As this solid-state imaging element 202, the above-explained CCD solid-state imaging device 10 in the previous embodiment may be utilized. Various sorts of drive operations in this solid-state imaging apparatus 205, for instance, reading out operation of signal charges, vertical transfer of signal charges, horizontal transfer of signal charges, and read out mode switching of all-pixel read out mode/thinning read out mode are carried out in response to pulses generated from a timing generating circuit 203. The imaging signal outputted from this solid-state imaging apparatus 205 is processed by a signal processing circuit 204 in various signal process operations.

While the present invention has been described in detail, since at least one piece of the charge sweeping-out pulse is produced just after the signal charges are read out during the exposing time period immediately before the read out mode is transferred from the thinning read out mode to the all-pixel read out mode, such signal charges can be discharged. That is, these signal charges have not been read out from the thinned pixel columns during the thinning read out drive operation, but thus are left therein. As a consequence, when the read out operation is transferred to the all-pixel read out drive operation, it is possible to avoid such an adverse influence caused by that the left signal charges are mixed with the signal charges read out during this all-pixel read out drive operation.

What is claimed is:

1. An imaging device, comprising:
   a plurality of sensor units that are disposed in a column and that define at least at first sensor set including A number of adjacent sensor units and a second sensor set including B number of adjacent sensor units;
   a first transfer channel,
   at least one transfer electrode coupled between each sensor unit and the first transfer channel,
   a first bus coupled to the first sensor set,
   a second bus coupled to the second sensor set, wherein both A and B are at least equal to one and at least one of A and B is greater than one,
   means for selecting between the first bus, the second bus, and the first and second buses to receive a mode signal, where the means for selecting includes a mode signal bus, and means for distributing the mode signal onto at least one of the first bus and the second bus as a function of the means for selecting, where the means for distributing includes a timing generating circuit, where the timing generating circuit is configured to generate a signal charge sweeping-out pulse (i) immediately after any signal charges are read out from a thinned read out mode and (ii) before the thinned read out mode is switched to an all-pixel read out mode.

2. The imaging device of claim 1, wherein the first sensor set includes three sensor units and the second sensor set includes four sensor units.

3. The imaging device of claim 1, wherein the plurality of sensor units further define a third sensor set including C number of sensor units.

4. The imaging device of claim 1, wherein the second sensor set includes one sensor unit.

5. The imaging device of claim 1, wherein the at least one transfer electrode is a second transfer electrode, the imaging device further comprising:
    a plurality of first transfer electrodes, each coupled to the first transfer channel through a third bus; and
    a plurality of third transfer electrodes, each coupled to the first transfer channel through a fourth bus,
    wherein each second transfer electrode is disposed between a first transfer electrode and a third transfer electrode.

6. The imaging device of claim 5, wherein each second transfer electrode is coupled to an associated sensor unit through a read out gate unit.

7. The imaging device of claim 1, further comprising:
    means for transferring scanning line signal charges from the first transfer channel.

8. The imaging device of claim 7, wherein the means for transferring includes a horizontal charged-coupled device, the imaging device further comprising:
    at least one vertical charged-coupled device having the first transfer channel and the at least one transfer electrode; and
    a charge/voltage converting unit coupled to the horizontal charged-coupled device.

9. The imaging device of claim 1, further comprising an electronic shutter coupled to each sensor unit.

10. The imaging device of claim 9, whereby an exposing time in a nonnal electronic shutter function is controlled and any adverse influence given to the exposing time by a difference in the generation of the signal change sweeping-out pulse and any other pulse is minimized.

11. A camera, comprising:
    an optical system;
    a signal processing circuit;
    a solid-state imaging apparatus in communication with the optical system and the signal processing circuit wherein the solid-state imaging apparatus includes
        a plurality of sensor units that are disposed in a column and that define at least a first sensor set including A number of adjacent sensor units and a second sensor set including B number of adjacent sensor units;
        a first transfer channel;
        at least one transfer electrode coupled between each sensor unit and the first transfer channel,
        a first bus coupled to the first sensor set;
        a second bus coupled to the second sensor set, wherein both A and B are at least equal to one and at least one of A and B is greater than one,
    means for selecting between the first bus, the second bus, and the first and second buses to receive a mode signal, where the means for selecting includes a mode signal bus; and
    means for distributing the mode signal onto at least one of the first bus and the second bas as a function of the means for selecting, where the means for distributing includes a timing generating circuit,
    where the timing generating circuit is configured to generate a signal charge sweeping-out pulse (i) immediately after any signal charges are read out from a thinned read out mode and (ii) before the thinned read out mode is switched to an all-pixel read out mode.

12. The camera of claim 11, wherein the second sensor set includes one sensor unit.

13. The camera of claim 11, wherein the at least one transfer electrode is a second transfer electrode, the camera further comprising:
    a plurality of first transfer electrodes, each coupled to the first transfer channel through a third bus; and
    a plurality of third transfer electrodes, each coupled to the first transfer channel through a fourth bus,
    wherein each second transfer electrode is disposed between a first transfer electrode and a third transfer electrode.

14. The camera of claim 11, further comprising:
    means for transferring scanning line signal charges from the first transfer channel.

15. The camera of claim 11, wherein the means for transferring includes a horizontal charged-coupled device, the camera further comprising:
    at least one vertical charged-coupled device having the first transfer channel and the at least one transfer electrode; and
    a charge/voltage converting unit coupled to the horizontal charged-coupled device.

16. The camera of claim 11, brother comprising:
    an electronic shutter coupled to each sensor unit.

17. The camera of claim 16, whereby an exposing time in a normal electronic shutter function is controlled and any adverse influence given to the exposing time by a difference in the generation of the signal charge sweeping-out pulse and any other pulse is minimized.

18. A method to drive an imaging device, comprising the steps of
    (i) presenting a plurality of sensor units that are disposed in a column and that define at least a first sensor set including A number of adjacent sensor units and a second sensor set including B number of adjacent sensor units,
    (ii) presenting a first transfer channel and at least one transfer electrode coupled between each sensor unit and the first transfer channel;
    (iii) presenting a first bus coupled to the first sensor set and a second bus coupled to the second sensor set, wherein both A and B are at least equal to one and at least one of A and B is greater than one;
    (iv) selecting between the first bus, the second bus, and the first and second buses to receive a mode signal;
    (v) receiving the mode signal onto at least one of the first bus and the second bus as a function of the selecting,
    (vi) distributing signal charges from the plurality of sensor units to the first transfer channel as is function of the mode signal, and (vii) where a thinned read out mode is defined by receipt of the mode signal on the first bus where an all-pixel react out mode is defined by receipt of the mode signal on the first and second bus, where receiving the mode signal includes receiving the mode signal onto the first bus, and, to discharge the signal charges in the second sensor set to a substrate, distributing a signal charge sweeping-out pulse to the second sensor set immediately after any signal charges are read out from the thinned read out mode and before the thinned read out mode is switched to the all-pixel read out mode.

19. The method of claim 18, further comprising:

converting light into signal charges within the plurality of sensor units.

20. The method of claim 18, whereby an exposing time in a normal electronic shutter function is controlled and any adverse influence given to the exposing time by a difference in the generation of the signal charge sweeping-out pulse and any other pulse is minimized, the method further comprising:

returning to step (vi) and selecting the first and second buses to receive the mode signal.

21. An imaging device, comprising a plurality of sensor units that are disposed in a column and that define at least a first sensor set including A number of adjacent sensor units and a second sensor set including B number of adjacent sensor units, where the first sensor set includes three sensor units and the second sensor set includes four sensor units;

a first transfer channel;

at least one transfer electrode coupled between each sensor unit and the first transfer channel;

a first bus coupled to the first sensor set, and a second bus coupled to the second sensor set, wherein both A and B are at least equal to one and at least one of A and B is greater than one.

22. The imaging device of claim 21, wherein the plurality of sensor units further define a third sensor set including C number of sensor units.

23. The imaging device of claim 21, wherein the second sensor set includes one sensor unit.

24. An imaging device comprising:

a plurality of sensor units that are disposed in a column and that define at least a first sensor set including A number of adjacent sensor units and a second sensor set including B number of adjacent sensor units;

a first bus coupled to the first sensor set, a second bus coupled to the second sensor set, wherein both A and B are at least equal to one and at least one of A and B is greater than one, a first transfer channel, a plurality of first transfer electrodes, each coupled to the first transfer channel through a third bus;

at least one transfer electrode coupled between each sensor unit and the first transfer channel, where the at least one transfer electrode is a second transfer electrode; and a plurality of third transfer electrodes, each coupled to the first transfer channel through a fourth bus, where each second transfer electrode is disposed between a first transfer electrode and a third transfer electrode and where each second transfer electrode is coupled to an associated sensor unit through a read out gate unit.

25. The imaging device of claim 24, further comprising:

means for transferring scanning line signal chards from the first transfer channel.

26. The imaging device of claim 25, where the means for transferring includes a horizontal charged-coupled device, the imaging device further comprising:

at least one vertical charged-coupled device having the first transfer channel and the at least one transfer electrode; and a charge/voltage converting unit coupled to the horizontal charged coupled device.

* * * * *